United States Patent Office 3,120,250
Patented Feb. 4, 1964

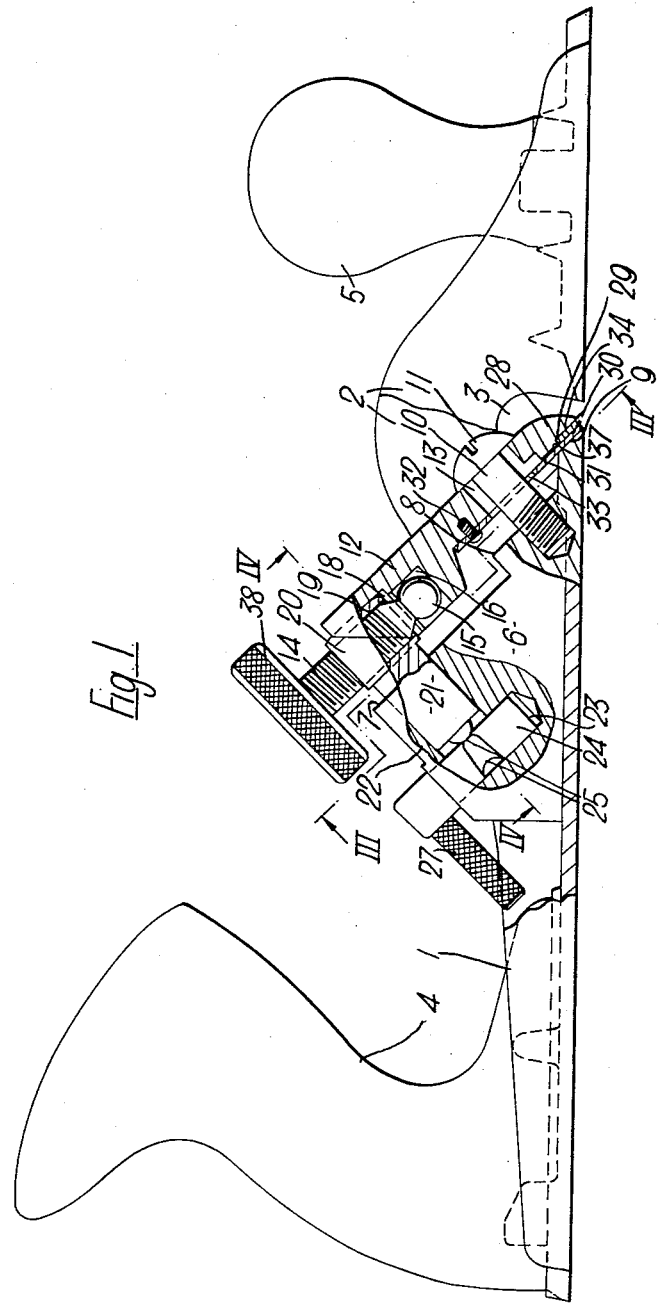

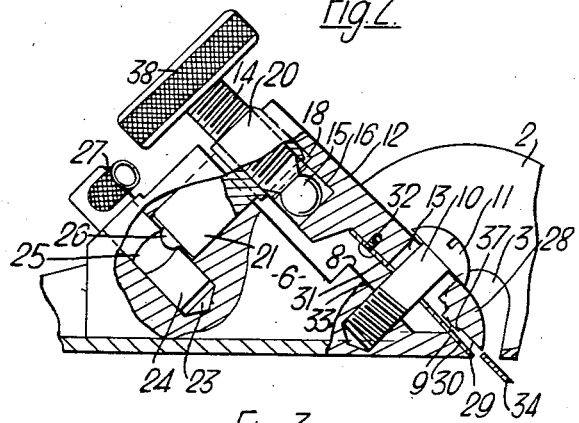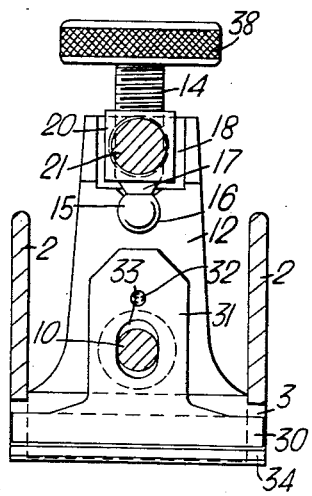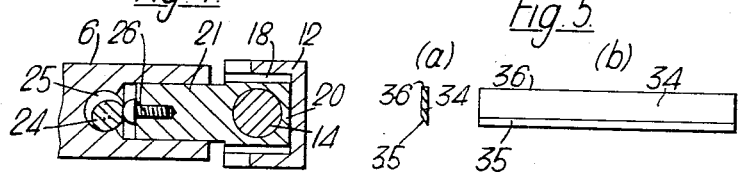

3,120,250
WOOD-WORKING PLANES
Marcus R. Dakin, Chapeltown, Sheffield, England,
assignor to F. Parramore & Sons (1924) Limited
Filed Sept. 7, 1962, Ser. No. 221,967
Claims priority, application Great Britain Sept. 15, 1961
9 Claims. (Cl. 145—11)

This invention relates to wood-working planes of the metal-bodied type and having provision for adjustment of its blade both lengthwise of its oblique support shoulder towards and away from the throat and also angularly with respect to the throat, together with means for clamping the adjusted blade to the shoulder.

According to the present invention, a wood-working plane of the type referred to comprises a clamping member capable of rocking about the axis of a clamping pivot normal to the oblique face of the shoulder and of movement lengthwise of the shoulder with respect to the pivot, means on the lower end of the clamping member for engagement with a replaceable blade such that the blade partakes of both endwise and rocking movements of the member, and an adjusting screw parallel to the face of the shoulder and passing through a tapped hole in a thrust block carried by the shoulder and rotatable about an axis normal to the face of the shoulder, the lower end of the screw and the upper end of the clamping member mutually inter-engaging so that the latter follows endwise movement caused by rotation of the screw and sideways movement caused by rocking the screw about the thrust block axis.

With the clamping member clamped to the shoulder tightly enough to prevent rocking of the clamping member under normal working forces applied to the blade, the clamping member can be moved lengthwise by rotation of the screw until the blade correctly protrudes by a desired amount at the throat of the body, and it can also be rocked about its clamping pivot by rocking of the screw about the thrust block axis until the blade edge is parallel to the mouth of the throat.

The clamping member may be formed with a blade-receiving transverse rebate in the underface of its lower end and carry a transverse plate that overlies the open underside of the rebate but it is movable towards and away from that underside, the clamping member being mounted with freedom to rock on the oblique face of the shoulder about an axis transverse to itself and that oblique face in the vicinity of the clamping pivot, such that tightening of the clamping member grips both the transverse plate and a blade inserted in the rebate to the oblique face. This permits the gripping of the blade to be purely frictional, when the blade may be a plain strip of tool steel, bevelled on one or both edges; but, as described below, positive means may be provided for locating the blade on the clamping member.

For such frictional holding of the blade, a spring may be provided, to operate in the direction opposite to the urge required for the gripping of the blade. Thus, the transverse plate may itself be a spring.

The clamping member need have no more than a lengthwise slot for the passage of the clamping pivot to enable it to move lengthwise with respect to the pivot. Advantageously, the pivot consists of a screw secured to the shoulder and provided with a head to bear on the clamping member.

A preferred form of thrust block has a round stem to fit a corresponding pivot hole in the shoulder. With the clamping member engaged to the lower end of the screw, the thrust block is retained in position, yet free to rock about its axis as the screw is rocked.

The interengagement between the screw and the clamping member is conveniently provided by a ball-end on the former and an open-sided hole in the latter of the diameter of the ball, normal to the face of the support shoulder, the neck of the ball-end passing freely through the open side of the hole.

It is an advantage of the invention that a relatively inexpensive replaceable blade can be used, consisting of a narrow strip of tool steel, single-edged or double-edged, but capable of being very firmly held in adjusted operative position by the clamping member. The whole construction is also exceedingly simple, involving only the slotted clamping member with open-sided hole, the screw with a ball-end and knurled head, the pivoted thrust block for the screw, and the clamping means, e.g., a lever operating a cam-spindle, together of course with a body of any usual general type.

The invention will now be further described with reference to a preferred embodiment, shown in the accompanying drawings, in which:

FIGURE 1 is a side elevation, partly in section, of a wood-working plane with a single-edged blade frictionally held in operative position;

FIGURE 2 is a corresponding view of the middle portion of the plane of FIGURE 1, now with the blade released;

FIGURE 3 is a section taken on the line III—III of FIGURE 1;

FIGURE 4 is a fragmentary section taken on the line IV—IV of FIGURE 1; and

FIGURES 5(a) and (b) show in section and underneath plan the single-edged blade of FIGURES 1 and 2;

In FIGURE 1, a plane with a metal body 1, of U-section (FIGURE 3) the sides 2 of which increase to maximum height above a throat 3, is provided with the usual handle 4 for one hand and knob 5 for the other. Between the sides 2 is a shoulder 6, with parallel oblique faces 7, 8, 9, the last of which emerges at the throat 3. The throat 3 opens to both sides of the body 1, so that the surface 9 is accessible from either side of the body.

A screw 10 projecting from the face 8 provides by its head 11 a bearing location for the upper surface of a clamping member 12, which has a slot at 13 so that it is movable parallel to the faces 7, 8, 9, by the action of a screw 14 with a ball 15 at its lower end fitting a cylindrical hole 16 in the underside of the member 12. A neck 17 (FIGURE 3) of the screw 14 is engaged in an open side of the hole 16 where the latter is connected to a recess 18 in the member 12.

The screw 14 passes through a tapped hole 19 in a thrust block 20 having a stem 21 rotatable in a pivot hole 22 in the shoulder 6 normal to the face 7. In a hole 23 parallel to the face 7 is a cam-spindle 24 with an eccentric groove 25 (see particularly FIGURE 4) to provide a cam for engagement with the head of a pin 26 protruding from the stem 21. A lever 27 on the spindle 24 enables the thrust block 20 to be pressed to the top of the recess 18 by a part-rotation of the lever.

In the underside of the lower end 28 of the clamping member 12 is a rebate 29, overlapped by the transverse lower end 30 of a spring plate 31 pinned at 32 to the member 12, the plate having a slot 33 for the passage of the clamping screw 10. The rebate 29 receives a blade 34 (see also FIGURES 5(a) and (b)) of tool steel, with a single bevelled edge 35. The plain rear edge 36 of the blade bears against the rear edge 37 of the rebate 29.

In the operative position shown in FIGURE 1, the blade 34 is gripped between the clamping member 12 and the plate portion 30, that portion being pressed on to the face 9 by the downward urge of the lower end 28 of the member 12 as the upper end is urged upwardly to clamping position by the thrust block 20 on rotation of the lever 27 to the downward position seen in FIGURE 1.

The clamping pressure being transmitted directly by the block 20 to the member 12, the screw 14 is not subjected to that pressure.

The upper surface of the member 12 rocks about a transverse axis by its engagement with the underside of the head 11 of the screw 10, as appears from FIGURE 2, in which the lever 27 has been given a partial turn from its position in FIGURE 1 (the turning can be in either direction) to relax the thrust of the block 20, when the spring plate 31 urges the lower end 28 of the clamping member 12 upwardly. This enables the blade 34 to be released.

The blade (or a replacement blade) can be slid into the rebate 29 from either side of the throat 3, and immediately secured by operation of the lever 27 to restore the clamping position of FIGURE 1.

A large knurled head 38 on the screw 14 provides for fine movement of the clamping member 12 and the blade 34 parallel to the face 9, for adjustment of the cut. The head 38 gives a firm purchase for rocking the thrust block 20 about its stem 21, the simultaneous rocking of the screw 14 causing the ball-end 15 to rock the clamping member 12 to one side or the other about the pivot provided by the screw 10, to bring the edge 35 of the blade 34 parallel to the mouth of the throat 3. When clamped by the operation of the lever 27, the clamping member 12 still has ability to receive these endwise and rocking movements for adjustment of the clamped blade 34.

To dismantle the plane, the screw 10 is removed, when the clamping member 12 may be lifted from the thrust block 20, the ball-end 15 passing out of the lower open end of the hole 16. However, it is not necessary to remove the member 12 for removal and replacement of the blade 34.

What I claim is:

1. A metal-bodied wood-working plane, with a throat for the emergence of the edge of a cutting blade, comprising an oblique shoulder directed towards the throat, a clamping pivot normal to the shoulder, a clamping member with a lengthwise slot for pivoting and sliding with respect to the pivot, an adjusting screw parallel to the shoulder in line with and engaging the upper end of the clamping member, a thrust block having a tapped hole for the screw and mounted for rotation about an axis normal to the shoulder, and an oblique face at the throat for the support of a narrow replaceable blade to be pressed towards said face by the underside of the lower end of the clamping member.

2. A plane as in claim 1, comprising a ball-end on the adjusting screw and an open-sided hole in the clamping member to receive the ball-end, to provide the engagement between the screw and that member, such that the clamping member partakes of lengthwise movement of the screw and also can be moved about its clamping pivot by movement of the screw about the thrust block axis.

3. A plane as in claim 1, wherein the underside of the lower end of the clamping member is provided with means for positive engagement with a replaceable blade applied to it, whereby the blade partakes of the pivoting and sliding movements of the clamping member with respect to the pivot of the latter and to the oblique face at the throat of the plane.

4. A metal-bodied wood-working plane, with a throat for the emergence of the edge of a cutting blade, comprising an oblique shoulder directed towards the throat, a correspondingly oblique face across the throat, a clamping member mounted on the shoulder, a narrow replaceable blade engageable to the underside of the lower end of the clamping member, a pivotal mounting permitting the clamping member to pivot and to slide lengthwise of the shoulder for adjustment of cut and parallelism of the blade, an adjusting screw parallel to the shoulder, in engagement with the upper end of the clamping member, and a pivotal thrust-block mounting for the screw, whereby the screw may be used to rock to pivot the clamping member and the blade as well as to adjust them lengthwise.

5. A metal-bodied wood-working plane, with a throat for the emergence of the edge of a cutting blade, comprising an oblique shoulder, a pivot hole normal to the face of the shoulder, a stem supported in the hole, a thrust block integral with the stem, a tapped hole through the thrust block parallel with the face of the shoulder, an adjusting screw in the tapped hole, an oblique clamping member mounted on the shoulder and pivotally connected to one end of the screw, for rotation of the screw to effect lengthwise adjustment of the clamping member relative to the thrust block, a headed clamping pivot normal to the shoulder and passing through a slot in the member permitting both lengthwise movement and transverse pivoting of the member, the upper end of the clamping member overlying the thrust block, and a cam engaging the bottom of the thrust block stem for rocking of the clamping member relative to the clamping pivot head, the underface of the end of the clamping member remote from the adjusting screw being adapted to engage and clamp at the throat a narrow replaceable blade that is adjusted for cut by lengthwise movement of the clamping member and for parallelism by pivoting of the clamping member resulting from pivoting of the adjusting screw and the thrust block about the axis of the stem of the latter.

6. A plane as in claim 5, wherein the cam for the thrus block stem is provided by a spindle with an eccentric groove, there being a projection from the bottom of the stem to engage the groove, and a lever on the spindle to effect partial rotation of the spindle.

7. A plane as in claim 5, comprising a spring to urge the clamping member in the opposite direction of rocking with respect to the clamping pivot head to that resulting from thrust of the cam on the thrust block stem.

8. A plane as in claim 5, comprising a spring plate secured below the clamping member and having a transverse portion across the underside of the lower end of the clamping member, that underside of the member having a rebate to receive a narrow replaceable blade overlapped by the transverse portion of the spring plate, rocking of the clamping member by thrust of the cam on the thrust block stem causing a blade inserted in the rebate to be frictionally gripped between the clamping member and the transverse portion at the throat of the plane.

9. A wood-working plane comprising a metal body, a throat across the underside of the body, an oblique shoulder directed towards the throat, a narrow blade-supporting oblique face at the throat, a clamping member on the shoulder extending to that face, means on the underside of the clamping member to engage a narrow replaceable blade to be supported by that surface, a headed clamping pivot normal to the shoulder, a lengthwise slot in the clamping member permitting lengthwise movement and pivoting with respect to the clamping pivot, the clamping member also having freedom to rock about a transverse axis with respect to the head of the pivot, a thrust block located below the end of the clamping member remote from the blade-engaging end, the thrust block being mounted for rotation in the shoulder about an axis normal to the shoulder and also being movable in the direction of that axis, an adjusting screw mounted in a tapped hole in the thrust block parallel to the shoulder, the screw having a ball-end providing pivotal engagement with the clamping member, the thrust block serving to take the thrust of lengthwise adjusting movement of the screw and providing for pivoting of the screw about the thrust block axis, and resulting pivoting of the clamping member, and a cam in engagement with the thrust block to effect rocking of the clamping member and gripping of a blade by that member.

References Cited in the file of this patent

UNITED STATES PATENTS

| | | |
|---|---|---|
| 1,090,225 | Page | Mar. 17, 1914 |
| 1,567,342 | Szako | Dec. 29, 1925 |
| 1,662,005 | Johnson | Mar. 6, 1928 |
| 2,575,787 | Binger | Nov. 20, 1951 |
| 3,084,729 | McAfee | Apr. 9, 1963 |